H. JOSEPHSON.
BRAKE MECHANISM FOR AUTOMOBILES OR MOTOR VEHICLES.
APPLICATION FILED SEPT. 6, 1917.
1,270,838.
Patented July 2, 1918.
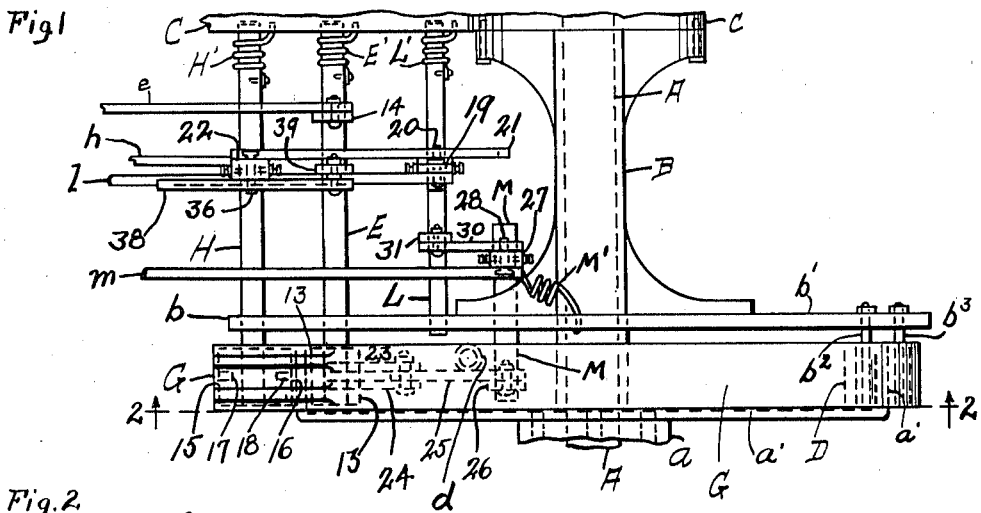
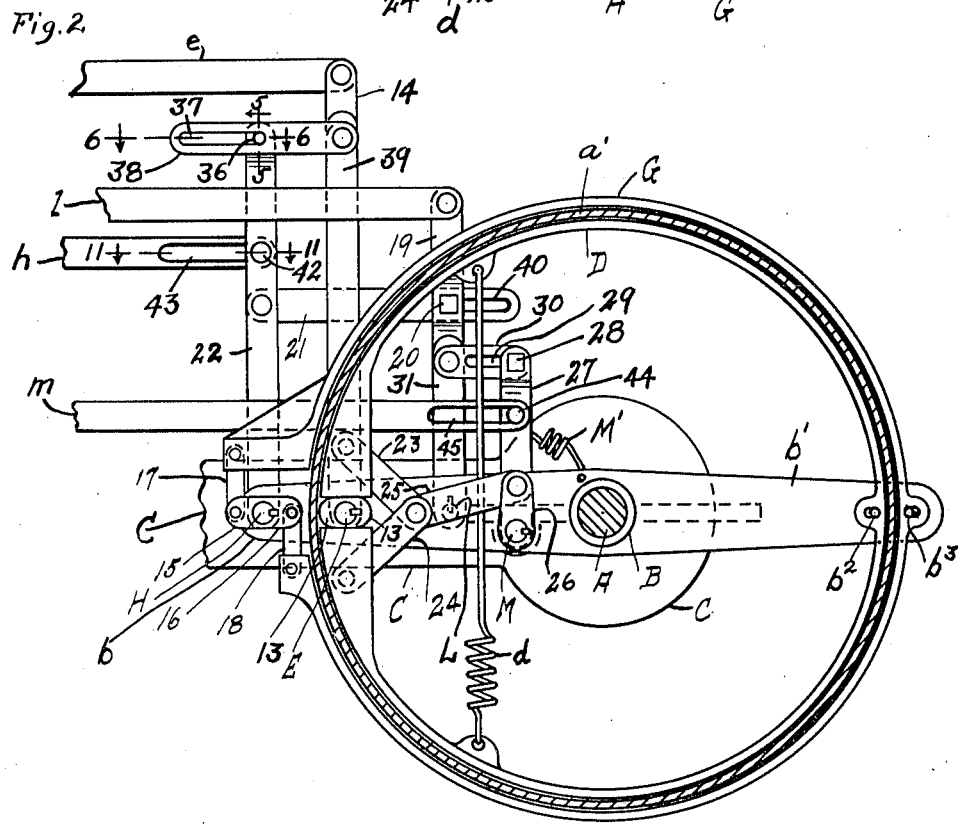

H. JOSEPHSON.
BRAKE MECHANISM FOR AUTOMOBILES OR MOTOR VEHICLES.
APPLICATION FILED SEPT. 6, 1917.
1,270,838.
Patented July 2, 1918.
2 SHEETS—SHEET 2.
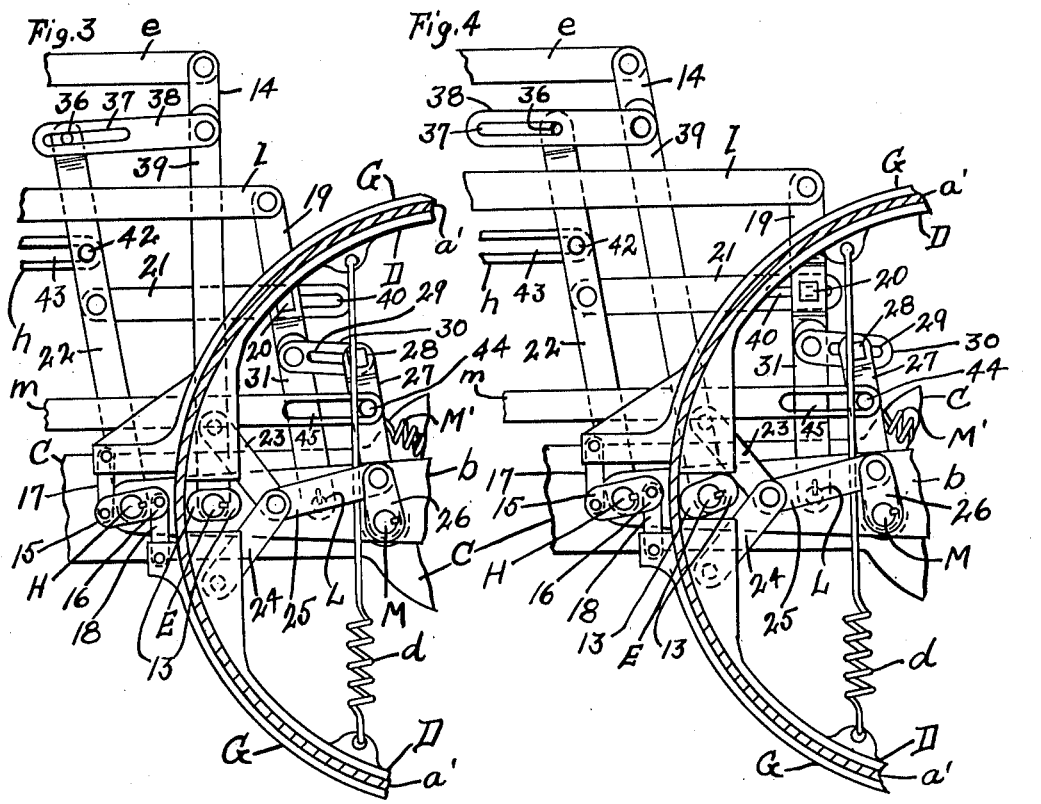
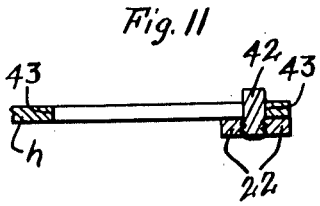
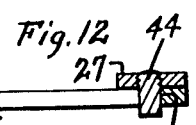
Witnesses.
Inventor.
Henry Josephson
By
his Attorney.

UNITED STATES PATENT OFFICE.

HENRY JOSEPHSON, OF CLEVELAND, OHIO.

BRAKE MECHANISM FOR AUTOMOBILES OR MOTOR-VEHICLES.

1,270,838.  Specification of Letters Patent.  Patented July 2, 1918.

Application filed September 6, 1917. Serial No. 189,927.

*To all whom it may concern:*

Be it known that I, HENRY JOSEPHSON, a citizen of the United States, residing at Cleveland, in the county of Cuyahoga and State of Ohio, have invented a new and useful Brake Mechanism for Automobiles or Motor-Vehicles, of which the following is a specification.

This invention relates to improvements in brake-mechanism for automobiles, and pertains more especially to brake-mechanism of the character indicated in which a brake-drum is connected to and rotatable with each rear wheel and connected driven axle-section of an automobile and an inner brake-shoe and an outer brake-shoe are arranged internally and externally respectively of said drum and normally in their non-braking position and adapted to be actuated into braking engagement with the drum.

One object of this invention is to enable said brake-shoes to be actuated simultaneously into their braking position by and during endwise movement, in the required direction, of the one or the other of two rods which are shiftable endwise independently of each other.

Another object is to have each of said brake-shoes shiftable into its braking position independently of the other of said brake-shoes.

Another object is not only to have said brake-shoes shiftable simultaneously into their braking position during movement of a rod endwise in the required direction, but to provide such connections between one of two additional rods and one brake-shoe and between the other brake-shoe and the other of said additional rods that the one or the other brake-shoe is shifted independently into its braking position according as the one or the other of said additional rods is shifted endwise in the required direction.

Another object is to provide mechanism comprising an endwise shiftable rod and employed in effecting the actuation of the hereinbefore mentioned inner brake-shoe into braking engagement with the hereinbefore mentioned drum during movement of said rod endwise in the required direction and to provide mechanism for effecting the actuation of the hereinbefore mentioned outer brake-shoe into braking engagement with said drum independently of the first-
mentioned mechanism and such an operative connection between said mechanisms that said actuation of said outer brake-shoe by the second-mentioned mechanism occurs during the aforesaid actuation of the aforesaid inner brake-shoe by the first-mentioned mechanism.

With these objects in view, and to attain any other object hereinafter appearing, and more especially to insure against a total disabling of the brake-mechanism of an automobile and to provide improved brake-mechanism whereby the braking power may be varied at will and with facility, this invention consists in certain features of construction, and combinations and relative arrangement of parts, hereinafter described in this specification, pointed out in the claims, and illustrated in the accompanying drawings.

In said drawings, Figure 1 is a top plan illustrating brake-mechanism embodying my invention. Fig. 2 is a vertical section taken along the line 2—2, Fig. 1. Figs. 3 and 4 show a portion of Fig. 2, but in Fig. 2 both illustrated brake-shoes are shown in their normal and non-braking position whereas in Fig. 3 said brake-shoes are shown actuated into their braking position by the forward endwise movement of one endwise shiftable rod arranged longitudinally of the automobile, and in Fig. 4 said brake-shoes are shown actuated into their braking position by the forward endwise movement of another correspondingly arranged endwise shiftable rod. Fig. 5 is a vertical section, in detail, taken along the line 5—5, Fig. 2, looking forwardly. Fig. 6 is a horizontal section, in detail, taken along the line 6—6, Fig. 2, looking downwardly. Fig. 7 is a vertical section, in detail, hereinafter referred to. Fig. 8 is a horizontal section, in detail, hereinafter referred to. Fig. 9 is a vertical section, in detail, hereinafter referred to. Fig. 10 is a horizontal section, in detail, hereinafter referred to. Fig. 11 is a horizontal section, in detail, taken along the line 11—11, Fig. 2. Fig. 12 is a horizontal section, in detail, hereinafter referred to.

Figs. 5, 6, 7, 8, 9, 10, 11 and 12 are drawn on a larger scale than Figs. 1, 2, 3 and 4.

Referring to Figs. 1 and 2 of said drawings, A indicates a suitably operated rotatable rear-axle-section of an automobile, which axle-section is arranged in the usual manner horizontally and transversely of the vehicle, and $a$ indicates the hub of the rear wheel operatively connected with said axle-section. A casing B, which is rigid with the transmission-case C of the automobile, surrounds said axle-section. A brake-drum, arranged adjacent the inner end of the hub $a$ and suitably secured to said hub, has its annular brake-member $a'$ arranged concentrically relative to said hub and the connected axle-section. The casing B is provided, at the inner end of the brake-drum, with two arms $b$ and $b'$ projecting forwardly and rearwardly respectively.

D indicates the inner brake-shoe arranged internally of the annular brake-member $a'$ of the brake-drum and held from being rotated by a stud $b^2$ rigid with the rearward arm $b'$ of the axle-casing. Said brake-shoe is normally in suitable proximity and loose relative to the internal surface of the brake-member $a'$ of the brake-drum and adapted to be actuated into braking engagement with said drum. Said brake-shoe extends circumferentially of the axle-section A, nearly but not entirely around said axle-section and therefore has its terminal ends spaced, and said ends of said brake-shoe are shown arranged adjacent the forward side of the drum.

A horizontally arranged brake-operating rock-shaft E, which is substantially parallel with and forward of the axle-section A, is supported in any approved manner, as for instance, from the transmission-case C and from the forward arm $b$ of the axle-casing B. Said shaft extends between the terminal ends of the brake-shoe D and is provided with two cams 13 which are arranged at the forward side and rearward side respectively of the shaft and adapted to farther separate said ends of said brake-shoe during the rotation of the shaft into its braking position, shown in Fig. 4, against the action of a suitably applied spiral spring $d$, and cause said brake-shoe to frictionally engage the internal surface of the brake-member $a'$ of the brake-drum. The spring $d$ extends between and is attached to opposite end-portions of the brake-shoe D. The cam-shaft E has an upwardly extending arm 14 operatively connected at its upper end with a rod $e$ extending forwardly from said arm and adapted to be operated by a lever not shown. A spring E' (see Fig. 1) is shown coiled around the cam-shaft E and attached at one end to said shaft and at its opposite end to the transmission-case C, and said shaft is adapted to make its braking movement against the action of said spring, and said spring as well as the spring $d$ act to retain, in normal position, the hereinbefore described mechanism for actuating the brake-shoe D into its braking position. I would here remark that the brake-shoe D is generally referred to as the "emergency" brake.

G indicates an outer brake-shoe which is arranged externally and extends circumferentially of the brake-member $a'$ of the brake-drum. Said outer brake-shoe is normally loose relatively to and adapted to be actuated into braking engagement with said drum. Said outer brake-shoe is held from rotating or movement circumferentially of the brake-drum by a stud $b^3$ rigid with the rearward arm $b'$ of the axle-casing. Said outer brake-shoe extends circumferentially of and nearly but not entirely around the brake-drum and has its terminal ends arranged adjacent the forward side and spaced circumferentially of the drum.

A horizontal brake-operating rock-shaft H is substantially parallel with and forward of the cam-shaft E and supported in any approved manner, as, for instance, from the transmission-case C and from the forward arm $b$ of the axle-casing. The shaft H is therefore parallel with the axle-section A. The shaft H is arranged farther forwardly than the forward side of the brake-drum and extends between the terminal ends of the outer brake-shoe G and is provided between said ends of said outer brake-shoe with two arms 15 and 16 projecting forwardly and rearwardly respectively. The upper terminal end of said outer brake-shoe is operatively connected by a link 17 with the forward arm 15 of the shaft H and the lower terminal end of said brake-shoe is operatively connected by a link 18 with the rearward arm 16 of said shaft. A spiral spring H' (see Fig. 1) is coiled around the shaft H and attached at one end to said shaft and at its opposite end to the transmission-case C, and said shaft is adapted to make its braking movement against the action of said spring, and consequently said spring acts to retain said shaft and the connected links 17 and 18 in their normal position in which the outer brake-shoe is loose relative to the brake-drum.

Intermediately of the cam-shaft E and the axle-casing B is a horizontal rock-shaft L substantially parallel with the cam-shaft E and shaft H and shown extending between and supported from the transmission-case C and the forward arm $b$ of the axle-casing. The shaft L has an upwardly projecting arm 19 operatively connected at its upper end with an endwise shiftable rod $l$ extending forwardly from said arm. During forward endwise movement of the rod $l$ and the consequent forward actuation of the shaft-arm 19 motion is transmitted from said arm, through the medium of a pin 20 and link 21, to an upwardly extending arm 22 of the shaft H so as to rotate said shaft, against the action of the spring H', in the direction required to cause the arms 15 and 16 and the links 17 and 18 to draw the terminal ends of the outer brake-shoe G toward each other and thereby actuate said outer brake-shoe, as shown in Fig. 3, into its braking position and cause said brake-shoe to frictionally engage the outer circumferential surface of the brake-member $a'$ of the brake-drum. The rod $l$ is preferably operatively connected with a foot-lever not shown. I would here remark that the outer brake-shoe is generally referred to as a "foot" brake. A spiral spring L' (see Fig. 1) is shown coiled around the shaft L and attached at one end to said shaft and at its opposite end to the transmission-case C, and said shaft is rotated against the action of said spring during forward endwise movement of the rod $l$.

Adjacent the terminal ends of the inner brake-shoe D and internally of the brake-drum is a toggle-joint which has one link 23 thereof attached to the upper terminal end of said brake-shoe and has its other link 24 attached to the lower terminal end of said brake-shoe, and said toggle-joint is operatively connected at its knuckle or knee, by a link 25, with an upwardly projecting arm 26 of a horizontally arranged brake-operating rock-shaft M which is supported in any approved manner, as, for instance, from the forward arm $b$ of the axle-casing. The shaft M is arranged intermediately of the shaft L and the axle-section A and substantially parallel with said axle-section and with the shafts E, H and L. The shaft M is provided adjacent the inner end-portion of the forward arm $b$ of the axle-casing with an upwardly projecting arm 27 which is provided at its upper end with a laterally projecting pin 28 which engages a slot 29 formed in and extending laterally through and longitudinally of a link 30 which is pivotally connected at its forward end to an upwardly extending arm 31 of the shaft L. In the normal position of the parts the pin 28 is arranged next the forwardly facing rear end wall of the slot 29, as shown more clearly in Fig. 10 which is a section taken horizontally and centrally through said pin and shows the pin-carrying portion of the arm 27, the link 30 and the adjacent portion of the arm 31 of the shaft L. It will be observed therefore that during endwise movement of the rod $l$ forwardly as required to effect the rotation of the shaft L in the direction required to move its arm 31 forwardly and thereby result in the actuation of the outer brake-shoe G into its braking position, the forwardly facing rear end wall of the slot 29 actuates the pin 28 and connected shaft-arm 27 forwardly and thereby effects the braking movement of the most rearward shaft M and results, through the medium of the arm 26 of said shaft, the link 25 and the connected toggle-joint, in the actuation of the inner brake-shoe D into its braking position. A spiral spring M', attached at one end to the arm 27 of the shaft M and at its opposite end to the forward arm $b$ of the axle-casing, is provided, and said shaft is adapted to make its braking movement against the action of said spring. The slot 29 in the link 30 extends such a distance forwardly of the pin 28 in the normal position of the parts that the toggle-joint and connected link 25 and shaft M and its arms 26 and 27 have idle motion during the actuation of the inner brake-shoe into its braking position by the mechanism comprising the rod $e$ and connected cam-shaft E, and therefore the movement of the toggle-joint, occurring during the braking movement of the cam-shaft E, does not disturb the shaft-arm 31 and consequently does not disturb the rod $l$. The shaft-arm 27 is shown operatively connected with an endwise shiftable rod $m$ extending forwardly from said shaft-arm and adapted to be operated by a lever not shown. As the relative arrangement of the pin 28 of the shaft-arm 27 and the slot 29 of the link 30 is such as to permit movement of the shaft-arm 27 forwardly independently of the arm 31 of the shaft L obviously the rod $m$ is adapted to be actuated endwise in a forward direction independently of the rod $l$, and consequently forward endwise movement of the rod $m$ independently of the rod $l$ results in the rotation of the most rearward brake-operating shaft M in the direction required to make its braking movement independently of the shafts E, H and L and actuate the connected inner brake-shoe into its braking position independently of the outer brake-shoe. It will be observed therefore that the rod $m$ and the most rearward brake-operating shaft M and its arms 26 and 27 and the connected toggle-joint constitute means for actuating the inner brake-shoe into its braking position independently of the outer brake-shoe and independently of the mechanism comprising the rod $e$ and the cam-shaft E.

The application of the pin 28 to the shaft-arm 27 is substantially the same as the application of the pin 20 to the shaft-arm 19. Referring again therefore to the connection between the arm 19 of the shaft L and the arm 22 of the shaft H it will be observed that in the normal position of the parts the pin 20 is arranged next the rearwardly facing forward end wall of a slot 40 formed in the link 21, as shown more clearly in Fig. 8, which is a section taken horizontally through said pin and only shows the pin-carrying portion of the arm 19 and the adjacent portion of said link. Preferably the pin 20 and the link 21 are relatively adjustable to facilitate positioning of said pin next the rearwardly facing forward end wall of the slot 40, and preferably said pin extends through a slot 32 formed in the shaft-arm 19 and extending longitudinally of the link 40, and said pin (see also Fig. 7 which is a section taken vertically through the pin-carrying portion of said shaft-arm 19 and the adjacent portion of the link 21) extends through the slot 32 in the shaft-arm 19 and through the slot 40 in the link 21. Threaded into the shaft-arm 19 (see Fig. 7) are two adjusting screws 33 arranged at opposite sides respectively of the pin 20 and in line endwise with each other and with the slot 32. Obviously the pin 20 can be readjusted endwise of the slot 32, and consequently longitudinally of the link 21, by a proper manipulation of the adjusting screws 33, and of course is secured in the desired adjustment by said screws upon tightening them relative to said pin so as to cause said pin to be firmly held by and between said screws, and lock-nuts 34 are shown mounted next externally of said shaft-arm 19 on said screws 33. Fig. 9, which is a section taken vertically through the pin-carrying portion of the shaft-arm 27 and the adjacent portion of the link 30, and Fig. 10 illustrate the application of the pin 28 to said shaft-arm, and it will be observed that said pin and said link are relatively adjustable, substantially in a manner not unlike the relative adjustability of the pin 20 and the link 21, to facilitate positioning of the pin 28 next the forwardly facing rear end wall of the slot 29.

The arm 22 of the shaft H extends above the connected link 21 and is provided at its upper end with a pin 36 projecting laterally of said arm into a slot 37 formed in and extending laterally through and longitudinally of a link 38 which extends forwardly from and is pivoted to an upright arm 39 of the cam-shaft E. In the normal position of the parts the pin 36 is arranged next forward of the forwardly facing rear end wall of the slot 37, as shown more clearly in Fig. 6 which is a section taken horizontally and centrally through said pin and shows the pin-carrying portion of the shaft-arm 22 and the adjacent portion of the link 38. It will be observed therefore that during endwise movement of the rod e forwardly as required to effect the braking movement of the cam-shaft E as hereinbefore indicated, the forwardly facing rear end wall of the slot 37 actuates the pin 36 and the connected shaft-arm 22 forwardly as required to effect the braking movement of the most forward shaft H and results, through the medium of the arms 15 and 16 of said shaft and the links 17 and 18, in the actuation of the outer brake-shoe G into its braking position against the action of the spring H'.

It will be observed that during endwise movement of the rod l forwardly as required to effect the rotation of the shaft L in the direction required to move its arm 19 forwardly the pin 20 of said arm 19, abutting against the rearwardly facing forward end wall of the slot 40 in the link 21, actuates said link and the connected shaft-arm 22 forwardly as required to effect the braking movement of the most forward brake-operating shaft H and thereby actuate the outer brake-shoe into its braking position, and said slot extends such a distance rearwardly of said pin in the normal position of the parts that said link has idle motion during the actuation of the outer brake-shoe into its braking position independently of the mechanism comprising the rod l and shaft L, and therefore the movement of said link occurring during the actuation of the outer brake-shoe into its braking position during forward endwise movement of the rod e and independently of the rod l does not disturb the shaft L.

The slot 37 in the link 38 extends such a distance forwardly of the pin 36 in the normal position of the parts that said pin has idle motion during the actuation of the outer brake-shoe into its braking position independently of the mechanism comprising the rod e and cam-shaft E, and therefore the movement of said pin occurring during the braking movement of the shaft H by forward endwise movement of the rod l does not disturb the mechanism employed in effecting the braking movement of the cam-shaft E. I would here remark that the application of the pin 36 to the shaft-arm 22 is substantially the same as the application of the pin 28 to the shaft-arm 27. Fig. 5, which is a section taken vertically through the pin-carrying portion of the shaft-arm 22 and the adjacent portion of the link 38, and Fig. 6 illustrate the application of the pin 36 to said shaft-arm, and it will be observed that said pin and said link are relatively adjustable, substantially like the pin 28 and link 30, to facilitate positioning of the pin 36 next the forwardly facing rear end wall of the slot 37.

The shaft-arm 22 is shown operatively connected with an endwise shiftable rod h extending forwardly from said shaft-arm and adapted to be operated by a lever not shown. As the relative arrangement of the pin 20 of the shaft-arm 19 and the slot 40 in the link 21 and the relative arrangement of the pin 36 of the shaft-arm h and the slot 37 in the link 38 are such as to permit movement of the shaft-arm 22 forwardly independently of the arm 39 of the cam-shaft E and independently of the arm 19 of the shaft L, obviously the rod h is adapted to be actuated endwise in a forward direction independently of the rods e, l and m, and consequently forward endwise movement of the rod h independently of the other rods mentioned results in the rotation of the most forward brake-operating shaft H in the direction required to make its braking movement independently of the shafts E, L and M and actuate the connected outer brake-shoe G into its braking position independently of the inner brake-shoe D. The operative connection between the rod $h$ and the shaft-arm 22 preferably comprises a pin 42 with which said shaft-arm is provided, which pin projects laterally of said shaft-arm into a slot 43 formed in and extending laterally through and longitudinally of said rod, as shown more clearly in Fig. 11, and in the normal position of the parts said pin is arranged next the forwardly facing rear end wall of said slot so that said shaft-arm is actuated forwardly during forward endwise movement of said rod, and said slot extends such a distance forwardly of said pin that said shaft-arm can be actuated forwardly independently of said rod. The operative connection between the rod $m$ and the shaft-arm 27 preferably comprises a pin 44 with which said shaft-arm is provided, which pin projects laterally of said shaft-arm into a slot 45 formed in and extending laterally through and longitudinally of said rod, as shown more clearly in Fig. 12 which is a horizontal section taken through the pin-bearing portion of said shaft-arm and the adjacent portion of said link, and in the normal position of the parts said pin is arranged next the forwardly facing rear end wall of said slot so that said shaft-arm is actuated forwardly during forward endwise movement of said rod, and said slot extends such a distance forwardly of said pin that said shaft-arm can be actuated forwardly independently of said rod.

By the construction and relative arrangement of the parts hereinbefore described it will be observed that the rod $e$ and the cam-shaft E and its cams 13 and arm 14 constitute mechanism employed in effecting the actuation of the inner brake-shoe into its braking position during forward endwise movement of said rod independently of the mechanism comprising the rod $l$ and shaft L; that the shaft H and its arms 15, 16 and 22 and the links 17 and 18 constitute mechanism employed in effecting the actuation of the outer brake-shoe into its braking position during the operation or independently of the mechanism comprising the rod $e$ and cam-shaft E; that the pin 36 of the shaft-arm 22 of the shaft H, the slotted link 38 and the arm 39 of the cam-shaft E constitute such a connection between said mechanisms that said actuation of the outer brake-shoe by the mechanism comprising the shaft H and its arm 22 occurs during the aforesaid actuation of the inner brake-shoe by the mechanism comprising the rod $e$ and cam-shaft E, and that the mechanism comprising the shaft-arm 22 and shaft H is capable of operation to effect the actuation of the outer brake-shoe into its braking position during forward endwise movement of the rod $h$ independently of the rod $e$; that during forward endwise movement of the rod $h$ independently of the rod $e$ the outer brake-shoe is actuated into its braking position independently of the inner brake-shoe, and that during forward endwise movement of the rod $e$ both brake-shoes are actuated into their braking position without incurring forward endwise movement of the rod $h$.

It will also be observed that the rod $l$, the shaft L and its arms 19 and 31, the toggle-joint and the connection between said toggle-joint and the shaft-arm 31 constitute mechanism employed in effecting the actuation of the inner brake-shoe into its braking position during forward endwise movement of said rod $l$ and independently of the mechanism comprising the rod $e$ and cam-shaft E; that the pin 20 and link 21 form such a connection between the shaft-arm 19 of the mechanism comprising the rod $l$ and shaft L and the shaft-arm 22 of the mechanism comprising the shaft H that the last-mentioned mechanism is capable of operation to effect the actuation of the outer brake-shoe into its braking position independently of the mechanism comprising the rod $l$ and shaft L and that said actuation of the outer brake-shoe occurs during endwise movement of the rod $l$ forwardly as required to actuate the inner brake-shoe into its braking position through the medium of the toggle-joint. It will be observed furthermore that the connection between each of the rods $e$ and $l$ and said brake-shoes is such that both brake-shoes are actuated into their braking position during forward endwise movement of either of said rods independently of the other of said rods; that not unimportant is the shiftability of each brake-shoe into its braking position independently of the rods $e$ and $l$; that the connection between the outer brake-shoe and the rod $h$ and the connection between the inner brake-shoe and the rod $m$ are such that the one or the other of the said brake-shoes is shifted independently into its braking position according as the one or other of the said rods $h$ and $m$ is shifted endwise in a forward direction, and each of the rods $e$, $h$, $l$ and $m$ is movable endwise in a forward direction independently of the remainder of the said rods.

What I claim is:—

1. In brake-mechanism for an automobile, two rods movable endwise independently of each other, two brake-shoes normally in their non-braking position, and such a connection between each rod and both brake-shoes that said brake-shoes are actuated into their braking position during the actuation of either of the rods endwise in the required direction independently of the other of said rods.

2. In brake-mechanism for an automobile, two rods movable endwise independently of each other, two brake-shoes, and such a connection between each rod and both brake-shoes that said brake-shoes are shifted into their braking position during the actuation of the one or the other of said rods endwise in the required direction, each brake-shoe being shiftable into its braking position independently of the other brake-shoe.

3. In brake-mechanism for an automobile, the combination with two brake-shoes, of two rods shiftable independently of each other, and such a connection between each rod and the brake-shoes that both brake-shoes are simultaneously actuated into their braking position during movement of one or the other of said rods endwise in the required direction.

4. In brake-mechanism for an automobile, the combination, with two brake-shoes shiftable into their braking position independently of each other, of means for shifting one of said brake-shoes independently into its braking position, other means for shifting the other of said brake-shoes independently into its braking position, an endwise shiftable rod, and such an operative connection between said rod and both brake-shoes that said brake-shoes are actuated into their braking position during the actuation of said rod endwise in the required direction, each brake-shoe being shiftable into its braking position independently of said rod.

5. In brake-mechanism for an automobile, the combination, with two brake-shoes, of means for shifting one of said brake-shoes independently into its braking position, two rods $e$ and $l$ shiftable endwise independently of each other, and such an operative connection between each of said rods and both brake-shoes that said brake-shoes are actuated into their braking position during the actuation of either of said rods endwise in the required direction.

6. In brake-mechanism for an automobile, two rods movable endwise independently of each other, two brake-shoes, such an operative connection between each of the aforesaid rods and both brake-shoes that said brake-shoes are actuated into their braking position during the actuation of either of said rods endwise in the required direction independently of the other of said rods, an additional rod shiftable endwise independently of the first-mentioned rods, and such a connection between said additional rod and one brake-shoe that said brake-shoe is actuated into its braking position independently of the other brake-shoe during movement of said additional rod endwise in the required direction independently of the first-mentioned rods.

7. In brake-mechanism for an automobile, the combination, with two brake-shoes shiftable into their braking position independently of each other, of means for actuating said brake-shoes simultaneously into their braking position, two rods $h$ and $m$ movable endwise independently of each other, and such connections between one of said rods and one brake-shoe and between the other brake-shoe and the other of said rods that the one or the other of said brake-shoes is shifted into its braking position according as the one or the other of said rods is actuated endwise in the required direction.

8. In brake-mechanism for an automobile, an endwise movable rod, two brake-shoes, such an operative connection between said rod and both brake-shoes that said brake-shoes are actuated into their braking position during the actuation of said rod endwise in the required direction, two additional endwise movable rods $h$ and $m$, such connections between one of said additional rods and one brake-shoe and between the other brake-shoe and the other of said additional rods that the one or the other brake-shoe is actuated independently into its braking position according as the one or the other of said additional rods is shifted endwise in the required direction.

9. In brake-mechanism for an automobile, two endwise movable rods, two brake-shoes, such an operative connection between each of the aforesaid rods and both brake-shoes that said brake-shoes are actuated into their braking position during movement of said rods endwise in the required direction, two additional endwise movable rods, such connections between one of said additional rods and one brake-shoe and between the other brake-shoe and the other of said additional rods that the one or the other brake-shoe is actuated independently into its braking position according as the one or the other of said additional rods is shifted endwise in the required direction.

10. In brake-mechanism for an automobile, the combination with a rotary member, a brake-drum rotatable with said rotary member, an inner brake-shoe arranged internally of said drum, and an outer brake-shoe arranged externally of said drum, of mechanism comprising an endwise shiftable rod $e$ and employed in effecting the actuation of the inner brake-shoe into braking engagement with the drum during movement of said rod endwise in the required direction, mechanism for effecting the actuation of the outer brake-shoe into braking engagement with the drum independently of the first-mentioned mechanism, and such a connection between said mechanisms that said actuation of the outer brake-shoe by the second-mentioned mechanism occurs during the aforesaid actuation of the inner brake-shoe by the first-mentioned mechanism.

11. In brake-mechanism for an automobile, the combination, with a rotary member, a brake-drum rotatable with said rotary member, an inner brake-shoe internally of said drum, and an outer brake-shoe externally of said drum, of mechanism comprising an endwise movable rod *e* and capable of operation to effect actuation of the inner brake-shoe into braking engagement with said drum during movement of said rod endwise in the required direction, mechanism employed in effecting the actuation of the outer brake-shoe into braking engagement with said drum independently of the first-mentioned mechanism and comprising a shaft and such a connection between said shaft and the outer brake-shoe that said brake-shoe is actuated into its braking position during the rotation of the shaft in the required direction, said shaft having an arm, and such a connection between said arm and the first-mentioned mechanism that the aforesaid operation of the first-mentioned mechanism results in the actuation of said arm in the direction required to effect said rotation of said shaft.

12. In brake-mechanism for an automobile, the combination, with a rotary member, a brake-drum rotatable with said rotary member, an inner brake-shoe internally of said drum, mechanism comprising an endwise movable rod *e* and capable of operation to effect actuation of said brake-shoe into braking engagement with said drum during movement of said rod endwise in the required direction, and an outer brake-shoe externally of said drum, of an endwise shiftable rod *h*, mechanism capable of operation to effect actuation of the outer brake-shoe into braking engagement with said drum by and during movement of the second-mentioned rod endwise in the required direction independently of the first-mentioned rod, and such a connection between said mechanisms that operation of the second-mentioned mechanism to effect actuation of the outer brake-shoe into its braking-position occurs during the aforesaid operation of the first-mentioned mechanism and that the second-mentioned mechanism is capable of its aforesaid operation independently of the first-mentioned mechanism.

13. In brake-mechanism for an automobile, the combination, with a rotary member, a brake-drum rotatable with said rotary member, an inner brake-shoe internally of said drum, an outer brake-shoe externally of said drum, mechanism comprising an endwise movable rod *e* and capable of operation to effect actuation of the inner brake-shoe into its braking position during movement of said rod endwise in the required direction, and mechanism employed in effecting the actuation of the outer brake-shoe into its braking position independently of the first-mentioned mechanism and comprising a shaft and such an operative connection between said shaft and the outer brake-shoe that said brake-shoe is actuated into its braking position during rotation of the shaft in the required direction, said shaft having an arm, of such a connection between said arm and the first-mentioned mechanism that the aforesaid operation of said first-mentioned mechanism results in the actuation of said arm in the direction required to effect said rotation of said shaft, and an endwise movable rod *h* for actuating said arm in said direction.

14. In brake-mechanism for an automobile, the combination, with two brake-shoes, mechanism comprising an endwise movable rod and capable of operation to effect actuation of one brake-shoe into its braking position during movement of said rod endwise in the required direction, mechanism capable of operation to effect actuation of the other brake-shoe into its braking position independently of the first mentioned mechanism and comprising a shaft and such an operative connection between said shaft and the last-mentioned brake-shoe that said brake-shoe is actuated into its braking position during the rotation of the shaft in the required direction, said shaft having an arm, and such connection between said arm and the first-mentioned mechanism that the aforesaid operation of said first-mentioned mechanism results in movement of said arm in the direction required to effect said rotation of said shaft, of an endwise movable rod for actuating said arm in said direction, and such a connection between said arm and the last-mentioned rod that said arm is movable in said direction independently of said rod and that said arm is actuated in said direction during movement of said last-mentioned rod endwise in the required direction.

15. In brake-mechanism for an automobile, a brake-shoe, mechanism comprising an endwise movable rod *e* and employed in effecting the actuation of said brake-shoe into its braking position during movement of said rod endwise in the required direction, another brake-shoe, mechanism employed in actuating the second-mentioned brake-shoe into its braking position independently of the first-mentioned mechanism, and other mechanism instrumental in actuating the first-mentioned brake-shoe into its braking position independently of the first-mentioned mechanism.

16. In brake-mechanism for an automobile, the combination, with a brake-shoe, mechanism comprising an endwise movable rod e and employed in actuating said brake-shoe into its braking position during movement of said rod endwise in the required direction, another brake-shoe, and mechanism employed in effecting the actuation of the second-mentioned brake-shoe into its braking position independently of the first-mentioned mechanism, of other mechanism capable of operation to effect the actuation of the first-mentioned brake-shoe into its braking position independently of the first-mentioned mechanism, and such a connection between the third-mentioned mechanism and the second-mentioned mechanism that the second-mentioned mechanism is operated to effect the aforesaid actuation of the second-mentioned brake-shoe independently of the first-mentioned mechanism during the said operation of the third-mentioned mechanism.

17. In brake-mechanism for an automobile, the combination, with a brake-shoe, mechanism comprising an endwise movable rod e and employed in actuating said brake-shoe into its braking position during movement of said rod endwise in the required direction, another brake-shoe, and mechanism employed in effecting the actuation of the second-mentioned brake-shoe into its braking position independently of the first-mentioned mechanism, of another mechanism instrumental in actuating the first-mentioned brake-shoe into its braking position independently of the first-mentioned mechanism and comprising a shaft and such a connection between said shaft and said first-mentioned brake-shoe that said brake-shoe is actuated into its braking position during the rotation of said shaft in the required direction, said shaft having an arm, and such a connection between said arm and the second-mentioned mechanism that the aforesaid actuation of the second-mentioned brake-shoe independently of the first-mentioned mechanism occurs during said rotation of said shaft.

18. The combination, with a brake-shoe, mechanism comprising an endwise movable rod e and capable of operation to effect actuation of said brake-shoe into its braking position during movement of said rod endwise in the required direction, another brake-shoe, mechanism capable of operation to effect actuation of the second-mentioned brake-shoe into its braking position, and such a connection between said mechanisms that said operation of the second-mentioned mechanism occurs during the aforesaid operation of the first-mentioned mechanism and that the second-mentioned mechanism is capable of its aforesaid operation independently of the first-mentioned mechanism, of other mechanism for effecting actuation of the first-mentioned brake-shoe into its braking position independently of the first-mentioned mechanism, and such a connection between the third-mentioned and second-mentioned mechanisms that the aforesaid operation of the second-mentioned mechanism independently of the first-mentioned mechanism occurs during said actuation of the first-mentioned brake-shoe by the third-mentioned mechanism and that said third-mentioned mechanism remains undisturbed during the aforesaid operation of the second-mentioned mechanism with the first-mentioned mechanism.

19. The combination, with a brake-shoe, mechanism capable of operation to effect actuation of said brake-shoe into its braking position, another brake-shoe, mechanism capable of operation to effect actuation of the second-mentioned brake-shoe into its braking position independently of the first-mentioned mechanism and comprising a shaft and such a connection between said shaft and said second-mentioned brake-shoe that said brake-shoe is actuated into its braking position during rotation of the shaft in the required direction, said shaft having an arm, and such a connection between said arm and the first-mentioned mechanism that during the operation of said first-mentioned mechanism said arm is actuated to effect said rotation of said shaft, of other mechanism employed in actuating the first-mentioned brake-shoe into its braking position independently of the first-mentioned mechanism and comprising a shaft and such a connection between said shaft and said first-mentioned brake-shoe that said brake-shoe is actuated into its braking position during the rotation of the second-mentioned shaft in the required direction, said second-mentioned shaft having an arm, and such a connection between said arms that the third-mentioned mechanism remains undisturbed during the aforesaid operation of the second-mentioned mechanism with the first-mentioned mechanism.

20. The combination, with a brake-shoe, mechanism comprising an endwise movable rod e and capable of operation to effect actuation of said brake-shoe into its braking position during movement of said rod endwise in the required direction, another brake-shoe, mechanism capable of operation to effect actuation of the second-mentioned brake-shoe into its braking position, and such a connection between said mechanisms that said operation of the second-mentioned mechanism occurs during the aforesaid operation of the first-mentioned mechanism and that the second-mentioned mechanism is capable of its aforesaid operation independently of the first-mentioned mechanism, of a rod l, and such connections between the second-mentioned rod and the first-mentioned brake-shoe and between said second-mentioned rod and the second-mentioned mechanism that both brake-shoes are actuated into their braking position independently of the first-mentioned mechanism during movement of the second-mentioned rod endwise in the required direction.

21. The combination, with a brake-shoe, mechanism comprising an endwise movable rod $e$ and capable of operation to effect actuation of said brake-shoe into its braking position during movement of said rod endwise in the required direction, another brake-shoe, mechanism capable of operation to effect actuation of the second-mentioned brake-shoe into its braking position, and such a connection between said mechanisms that said operation of the second-mentioned mechanism occurs during the aforesaid operation of the first-mentioned mechanism and that the second-mentioned mechanism is capable of said operation independently of the first-mentioned mechanism, of other mechanism which comprises a rod $l$ shiftable endwise independently of the first-mentioned rod and is instrumental in effecting actuation of the first-mentioned brake-shoe into its braking position independently of the first-mentioned mechanism during movement of the second-mentioned rod endwise in the required direction independently of the first-mentioned rod.

22. The combination of a brake-shoe, mechanism comprising an endwise movable rod $e$ and capable of operation to effect actuation of said brake-shoe into its braking position during movement of said rod endwise in the required direction, another brake-shoe, mechanism capable of operation to effect actuation of the second-mentioned brake-shoe into its braking position, such a connection between said mechanisms that said operation of the second-mentioned mechanism occurs during the aforesaid operation of the first-mentioned mechanism and that the second-mentioned mechanism is capable of its aforesaid operation independently of the first-mentioned mechanism, another endwise movable rod $l$, and such connections between the second-mentioned rod and the first-mentioned brake-shoe and between said second-mentioned rod and the second-mentioned mechanism that both brake-shoes are actuated into their braking position independently of the first-mentioned mechanism during movement of said second-mentioned rod in the required direction independently of the first-mentioned rod, each brake-shoe being shiftable into its braking position independently of both of said rods.

23. The combination, with a rear wheel and connected axle-section of an automobile, a brake-drum rotatable with said wheel and axle-section, an inner brake-shoe internally of said drum, mechanism comprising an endwise movable rod $e$ and capable of operation to effect actuation of said brake-shoe into its braking position during movement of said rod endwise in the required direction, an outer brake-shoe externally of said drum, mechanism capable of operation to effect actuation of the outer brake-shoe into its braking position, and such a connection between said mechanisms that said operation of the second-mentioned mechanism occurs during the aforesaid operation of the first-mentioned mechanism and that the second-mentioned mechanism is capable of its aforesaid operation independently of the first-mentioned mechanism, of another endwise movable rod $l$, and such connections between the second-mentioned rod and the inner brake-shoe and between said second-mentioned rod and the second-mentioned mechanism that both brake-shoes are actuated into their braking position independently of the first-mentioned mechanism during movement of said second-mentioned rod endwise in the required direction independently of the first-mentioned rod.

In testimony whereof, I sign the foregoing specification, in the presence of two witnesses.

HENRY JOSEPHSON.

Witnesses:
 CASPER J. DORER,
 EMIL W. KRYZ.